US009219610B2

(12) United States Patent
Buckley et al.

(10) Patent No.: US 9,219,610 B2
(45) Date of Patent: Dec. 22, 2015

(54) METHOD FOR SECURING MESSAGES

(71) Applicants: Research In Motion Limited, Waterloo (CA); Certicom Corp., Mississauga (CA)

(72) Inventors: Michael Eoin Buckley, Grayslake, IL (US); Matthew John Campagna, Ridgefield, CT (US); Gregory Marc Zaverucha, Redmond, WA (US)

(73) Assignees: BlackBerry Limited, Waterloo, ON (CA); Certicom Corp., Mississauga, ON (CA)

( * ) Notice: Subject to any disclaimer, the term of this patent is extended or adjusted under 35 U.S.C. 154(b) by 102 days.

(21) Appl. No.: 13/791,378

(22) Filed: Mar. 8, 2013

(65) Prior Publication Data
US 2013/0246785 A1    Sep. 19, 2013

Related U.S. Application Data

(60) Provisional application No. 61/611,368, filed on Mar. 15, 2012.

(51) Int. Cl.
*H04L 9/32* (2006.01)
*H04W 4/22* (2009.01)
*H04W 12/10* (2009.01)

(52) U.S. Cl.
CPC ............ *H04L 9/3247* (2013.01); *H04L 9/3242* (2013.01); *H04W 4/22* (2013.01); *H04W 12/10* (2013.01)

(58) Field of Classification Search
USPC ....................................... 713/156
See application file for complete search history.

(56) References Cited

U.S. PATENT DOCUMENTS

2010/0268943 A1 * 10/2010 Roy-Chowdhury et al. . 713/156
2011/0208971 A1    8/2011 Bhattacharya et al.

FOREIGN PATENT DOCUMENTS

EP          2117200          11/2009

OTHER PUBLICATIONS

"ASC X9, Inc., New Project Proposal Form"; Feb. 15, 2011; 4 pages. Retrieved from the internet [https://www.x9.org/home/NWIP_-_implicit_certificates.pdf].
Campagna, Matthew; "Applications Using ECC"; Sep. 25, 2009; 18 pages. Retrieved from the internet [http://www.sourcemediaconferences.com/CTST09/PDF09/D/Wednesday/CampagnaMatthew.pdf].
Ericsson; "Further Discussions on Key Distribution"; 3GPP TSG SA WG3Security—SA3#63 (S3-110771); Apr. 11-Jul. 15, 2011; Mainz, Germany; 3 pages.
"Intelligent Transport Systems (ITS); Security; Trust and Privacy Management"; ETSI; TS 102 941 V0.2.7 (Dec. 2011); Jan. 4, 2012; 25 pages.
Rabadi, Nader M.; "Revised Self-Certified Implicit Certificate Scheme for Anonymous Communications in Vehicular Networks"; 2010 IEEE Vehicular Networking Conference; Dec. 13, 2010; 7 pages.

(Continued)

Primary Examiner — Tu Nguyen
(74) Attorney, Agent, or Firm — Fish & Richardson P.C.

(57) ABSTRACT

There is provided a method for secure communications. The method comprises obtaining a broadcast message, computing a signature for said broadcast message using a private key, and sending a transmission to a communication device. The private key is associated with a certificate and the transmission comprises the signature.

11 Claims, 4 Drawing Sheets

(56) References Cited

OTHER PUBLICATIONS

Research in Motion UK Limited; "Comments on LS Replies on Length of Security Information in PWS"; 3GPP TSG SA WG3 Security-SA3#XX (S3-111112); Nov. 7-11, 2011; San Diego, California; 4 pages.

Samsung; "Digital Signature Verification in EPS for PWS"; 3GPP TSG SA WG3 (Security) Meeting #66 (S3-120157); Feb. 6-10, 2012; Vancouver, Canada; 2 pages.

Vodafone; "Distribution of Keys for Protecting Public Warning Messages"; 3GPP TSG SA WG3 (Security) Meeting #63 (S3-110394); Apr. 11-15, 2011; Chengdu, China; 4 pages.

International Search Report and Written Opinion of the International Searching Authority issued in International Application No. PCT/US2013/029978 on Sep. 3, 2013; 13 pages.

International Preliminary Report on Patentability under Chapter I issued in International Application No. PCT/US2013/029978 on Sep. 25, 2014; 10 pages.

International Preliminary Report on Patentability under Chapter I issued in International Application No. PCT/US2013/029897 on Sep. 25, 2014; 9 pages.

3GPP: "3rd Generation Partnership Project: Technical Specification Group Services and System Aspects; Public Warning System (PWS) requirements (Release 11)"—retrieved on Mar. 14, 2012, section 4.8, 15 pages.

Johnson D et al. "The Elliptic Curve Digital Signature Algorithm (ECDSA)", International Journal of Information Security (IJIS) Springer, Heidelberg, DE. vol. 1, No. 1, Jul. 27, 2001, 28 pages.

Menezes, Alfred J. et al. "Handbook of Applied Cryptography, Chapter 11—Digital Signatures", in Handbook of Applied Cryptography, Jan. 1, 1997, 64 pages.

Standard specifications for Public Key Cryptography: Pintsov-Vanstone Signatures with Message Recovery, IEEE P1363a/D2, Jan. 20, 2000, 10 pages.

Struik et al., SEC 4: Elliptic Curve Qu-Vanstone Implicit Certificate Scheme (ECQV), v0.91 Nov. 18; http://www.secg.org/download/aid-775/sec4-ECQV-v091.pdf, 22 pages, 2008.

International Search Report and Written Opinion in PCT/US2013/029897 mailed on Jun. 26, 2013, 15 pages.

Office Action issued in U.S. Appl. No. 13/791,301 on Sep. 9, 2014.

\* cited by examiner

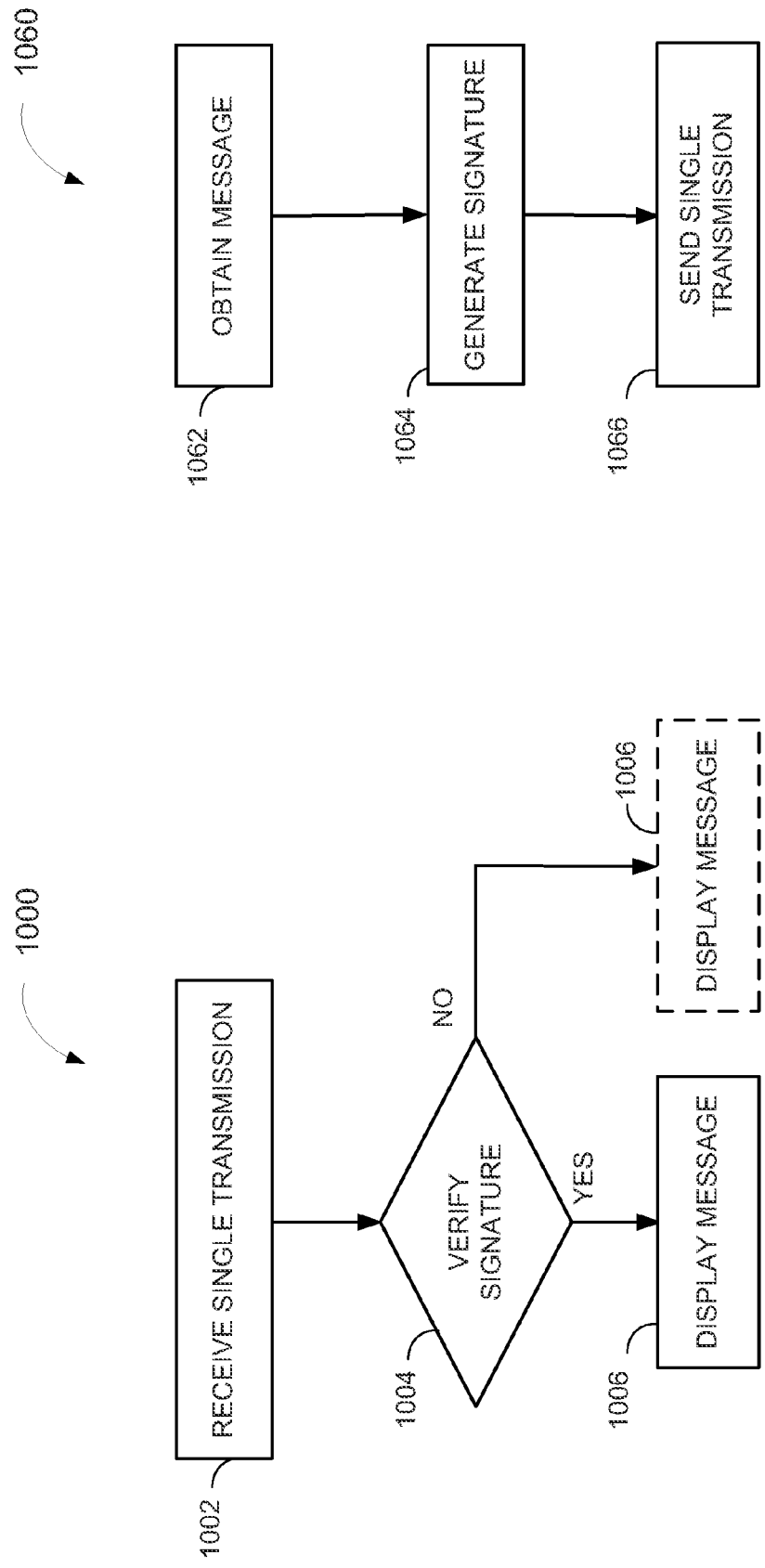

METHOD FOR SECURING MESSAGES

FIELD OF THE DISCLOSURE

The present disclosure relates to secure communications, and in particular to providing integrity and authentication for messages.

BACKGROUND

Cryptographic techniques (whether based on symmetric key cryptography or asymmetric key cryptography or both) have been used in various systems and networks to secure both data and messages. The appropriate choice of cryptographic primitives in a specific context may depend on various factors, such as for example, computational resource constraints or threat models.

Warning messages have been used to provide timely and accurate alerts, warnings and critical information regarding disasters and other emergencies. Examples of warning messages include the Public Warning System (PWS) messages described in the context of the Third Generation Partnership Project (3GPP). PWS provides a framework for Korean Public Alert System (KPAS), European Warning System (EU-ALERT), and Commercial Mobile Alert System (CMAS) messages which may fall into three classes: Presidential; Imminent Threat and Child Abduction Emergency; and Earthquake and Tsunami Warning System (ETWS) messages. Warning messages may include multiple components; for example, the warning message may include a description of the event, the geographical area affected by the event, a recommended action, an expiration time for the warning message; and the identity of an agency responsible for the warning message. Regulatory requirements may determine the components of the warning messages.

There is a general interest to enhance the reliability, resiliency, and security of warning messages to enable the public to take appropriate action to protect their families and themselves from serious injury, or loss of life or property. Therefore, the transmission of warning messages over communication networks may require that certain security requirements be met. For example, security requirements for warning messages may include any one or more of the following: (a) the integrity of the warning message or notification is protected; (b) the communication network will protect against false warning messages; and (c) only warning messages from authorized and authenticated sources will be transmitted via the communication network. Such security requirements may serve to minimize the reception of false warning messages that may cause hazardous conditions and/or widespread panic.

The security requirements for warning messages may be subject to regulatory policies and may also vary from region to region. An example of security requirements for warning messages may be found in the requirements for Public Warning System (PWS) messages broadcast in 3GPP, as specified in the document, 3GPP TS 22.268 v11.2.0, "Public Warning System (PWS) requirement (Release 11)".

In addition to the security requirements, the warning messages may also be associated with certain latency requirements. For example, the Earthquake and Tsunami Warning System (ETWS) being standardized may contain a requirement that the warning messages transmitted in these systems have a latency of less than 4 seconds. Such requirements may ensure that warning messages are received by users in a timely fashion. Such latency and/or other requirements may place constraints on the number of bytes used for the warning messages and/or any associated fields (e.g., security bits).

Communication networks should be designed to ensure that the security and latency requirements for these warning messages are satisfied while ensuring minimal bandwidth overhead and minimal resource consumption both in the core network and in the radio interface. In addition, the network design may have to ensure that legacy communication devices on the network are also able to process warning messages, so as to avoid liability caused due to users of such legacy devices not being aware of warning messages. The network design may also have to account for mobile devices that may roam from one network to another.

Various cryptographic techniques (whether based on symmetric key cryptography or asymmetric key cryptography or both) have been used in various systems to provide integrity and authentication for data and messages. The network designs for warning messages should make appropriate selection of cryptographic primitives so as to meet the other requirements (e.g., latency requirements) for warning messages, and also consider appropriate key management and distribution techniques to support the chosen cryptographic primitives.

DESCRIPTION OF DRAWINGS

Embodiments will now be described by way of example only, with reference to the attached drawings in which:

FIG. 3 and FIG. 4 illustrate in a flow diagram, an example of a method at a communication device and a message signer server, in accordance with an aspect of the present disclosure.

Like reference numerals and designations in the various drawings indicate like elements.

DETAILED DESCRIPTION

According to an aspect of the present disclosure, there is provided a method at a communication device. The method comprises receiving a transmission comprising a signature of a broadcast message, and verifying said signature using a certificate. In some embodiments, the certificate may be an implicit certificate, such as an Elliptic-Curve-Qu-Vanstone (ECQV) certificate. The signature may be computed using a signature algorithm such as an Elliptic Curve Digital Signature Algorithm (ECDSA), an Elliptic Curve Pintsov-Vanstone Signature (ECPVS) algorithm, a keyed-MAC signing scheme; or a Schnorr signing scheme. The verification of the signature may use public information along with the certificate. In an aspect, the broadcast message is a warning message.

According to another aspect of the present disclosure, there is provided a method at a server. The method comprises obtaining a broadcast message, computing a signature for the broadcast message using a private key, the private key associated with a certificate, and sending a transmission to a communication device, the transmission comprising the signature and the certificate.

According to another aspect of the present disclosure, there is provided a communication device comprising a processor and a memory including stored instructions. The communication device is configured to receive a transmission comprising a signature of a broadcast message, and to verify the signature using a certificate.

According to another aspect of the present disclosure, there is provided a server comprising a processor and a memory including stored instructions. The server is configured to obtain a broadcast message, compute a signature for the message using a private key, the private key associated with a certificate, and to send a transmission to a communication device, the transmission comprising the signature and the certificate.

Figure 1:
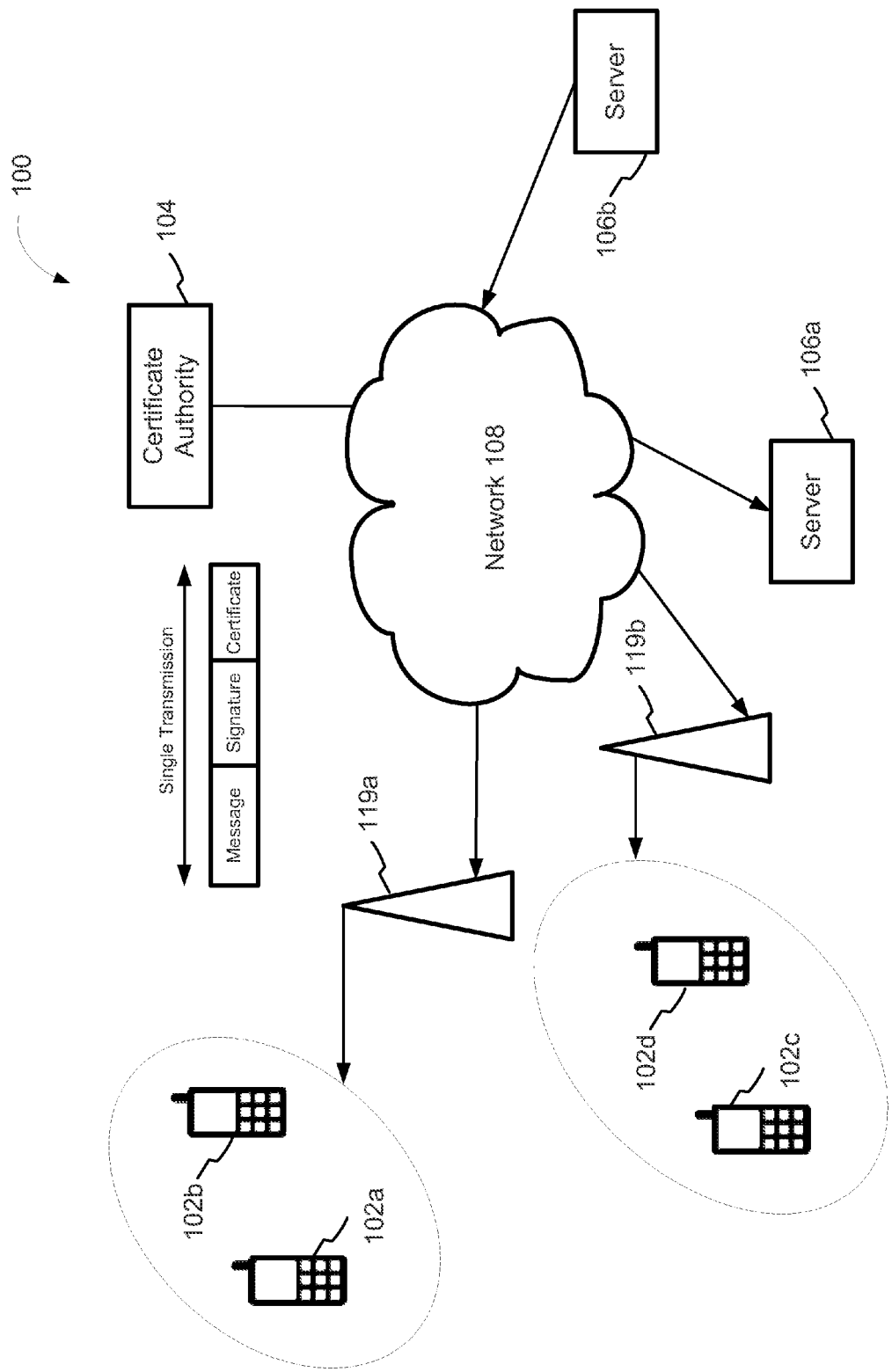
FIG. 1 illustrates an example of a communication system that can secure warning messages using asymmetric key cryptography.

FIG. 1 shows the schematic of a representative communication system 100 using asymmetric key cryptography techniques to provide integrity and authentication for warning messages transmitted to the one or more communication devices 102a-d. The communication system 100 includes a certificate authority server 104, one or more communication devices 102a-d, a network 108 and additional servers that 106a, 106b may be associated with the generation and/or processing of warning messages to be propagated to the communication devices 102a-d through the network 108. The communication system 100 can include additional, fewer, or different components. For example, the communication system 100 may include additional storage devices, additional servers (including additional certificate authority servers), additional communication devices, and other features not shown in the figure.

A private key is used by a message signer to compute a signature for the warning messages; a corresponding public key is used by the communication devices 102a-d to verify the received signature and to thus ensure that integrity and authentication of the warning message is preserved.

The message signer may be a source of the warning message. Thus, the message signer may be a server 106b operated by or otherwise affiliated with a government or a federal agency, for example, as proposed for the CMAS in Section III.B.10 of the Federal Communications Commission (FCC) First Report and Order of the Commercial Mobile Alert System, FCC 08-99, Apr. 9, 2008. The source may also be may be a server operated at an Emergency Operations Center. Various nodes within the communication network may perform additional formatting on any messages transmitted there-through.

The message signer may alternately be a server 106a operated by the network operator and not the server that is the source of the warning message. The server 106a receives the warning message from the source of the warning message using a communication link that provides integrity protection and authentication to the warning messages. This network server may interface with multiple base stations 119a, 119b used for broadcasting the warning messages to the plurality of communication devices 102a-b, 102c-d respectively within their geographical area of reach. In the 3GPP context, this network server may be a Cell Broadcast Centre (CBC) server.

The public key used to verify the signature of the warning messages has to be distributed to the communication devices so as to maintain trust, i.e., the communication devices must be assured that the public key is associated with the identity of the message signer (the owner of the private key used to generate the signature of the warning messages). This trust allows for protection against false warning messages, for example, from unauthorized sources.

The public key may be signaled using a secure channel to the communication devices 102a-d. For example, in the 3GPP environment, the public key may be signaled using the NAS layer such as with the TAU/RAU/LAU Accept messages. While such solutions may provide the communication devices with an assurance that the correct public key is received, they may incur an additional overhead when distributing a public key. In addition, when the distribution of the public key is done independent of the transmission of the signature of the warning message, there is no guarantee that the public key even arrives prior to the reception of the signature for the warning message. In addition, the network will also have to ensure that roaming devices also receive the public key as soon as possible so as to be provided an assurance of the integrity and authentication of any warning messages received thereafter.

The system of FIG. 1 utilizes a certificate authority (CA) 104 to issue certificates associated with the public key. The certificate binds the identity of the owner of the private key (the signer of the warning message) to the corresponding public key. A communication device can utilize public information to verify this binding of the identity and the public key, prior to verifying the signature of the warning message using the public key. Necessary public information for processing of the certificate (e.g., the CA's public key) may be provisioned to the communication devices 102a-d (and any servers optionally) either on manufacturing or in communication with a fixed root address. As only the CA is aware of the CA's private key, the certificates may be distributed using an open channel as opposed to other solutions that may require a secure channel for the distribution of the public key.

The CA server 104, the communication devices 102a-d and the servers 106a-b can communicate with each other and with other components of the communication system 100 over the network 108. In the example shown in FIG. 1, the message signer (whether a server 106a affiliated with the network operator or a server 106b affiliated with a federal agency) can send a certificate request to the certificate authority server 104, and the certificate authority can respond by sending an certificate. The server 106a or 106b can send a signature of the warning message to the communication devices 102a-d, and the communication device 102a-d can verify the signature using the certificate issued by the CA server 104. The communication system 100 can support additional or different types of communication. In some implementations, the communication devices 102a-d and the servers 106a-b may also exchange encrypted messages and other types of information with each other, and with the CA server 104. For example, a CA server may generate key pairs for the message signers, and may send the private key to the servers 106a or 106b using an encrypted channel.

The CA server 104 is a computing system that can perform operations of a CA in a cryptography system. The CA server 104 is generally operable to receive, transmit, process, and store information associated with the cryptography system. Although FIG. 1 shows a single CA server 104, a CA can be implemented using multiple CA servers 104, including server clusters, as well as additional or different types of computing devices other than servers.

As shown in FIG. 1, the signature of the warning message and the certificate (constituting the security information of the warning message) are transmitted to the communication device in a single transmission. In some implementations, the single transmission also comprises at least a portion of the warning message. In some implementations, the single transmission also comprises the entirety of the warning message. In the 3GPP context, this single transmission may be implemented as Cell Broadcast Service (CBS) data. Section 9.3 of 3GPP TS 23.401 v11.0.0: "General Packet Radio Service (GPRS) enhancements for Evolved Universal Terrestrial Radio Access Network (E-UTRAN) access" for example notes that the CBS message consists of at least some of several parameters including the warning message and the security information.

The single transmission of the certificate and the signature may provide advantages over systems that transmit the public key and the signature separately. For example, independent transmission of the public key may result in the communication device not being in possession of the public key even though it is in possession of the signature of the warning message, thus resulting in the communication device being unable to verify the integrity and authentication of the warning message. In addition, a public key that may be received by a communication device may also be revoked by the CA thereafter (prior to the reception of the signature of the warning message) as the corresponding private key may have been compromised in the interim period. In such scenarios, the revocation status of the public key will need to be obtained by the communication device to have an assurance of the integrity and authentication of the warning message, resulting in an additional level of complexity and overhead to the communication system 100.

Figure 2:
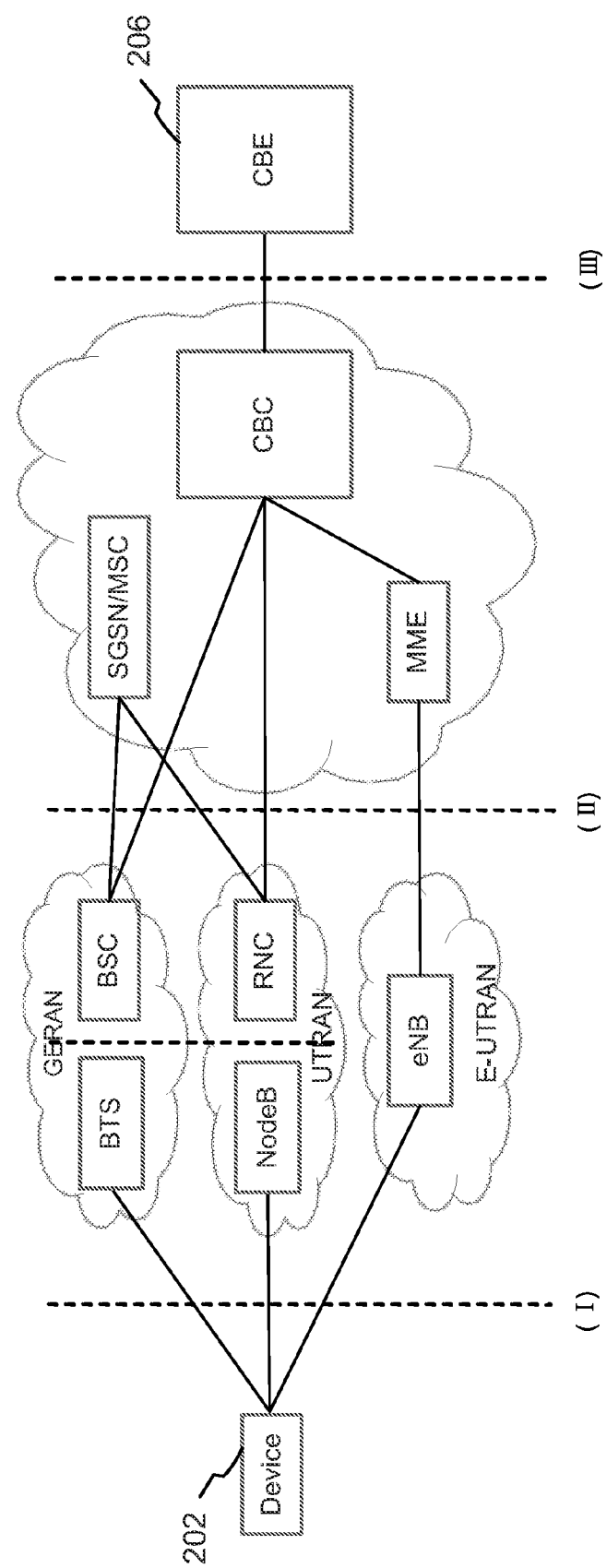
FIG. 2 illustrates an exemplary network that allows for transmission of the warning messages from the Cell Broadcast Entity (CBE) to the communication device using various nodes in the core and access networks.

FIG. 2 shows an exemplary architecture that allows for such a single transmission to the communication device 202. Other network architectures utilizing one or more of various radio network technologies may be used instead. The security requirement is primarily on account of the air interface between the communication devices and the access network where the warning messages are broadcast to the devices. The Cell Broadcast Centre (CBC) server is part of the core network and connects to the appropriate network node. For GSM Radio Access Network (GERAN), the CBC server connects with the Base Station Controller (BSC) in the access network; for Universal Terrestrial Radio Access Network (UTRAN), the CBC server connects with the Radio Network Controller (RNC) in the access network; and for Evolved Universal/ UMTS Terrestrial Radio Access Network (E-UTRAN), the CBC server connects with the Mobile Management Entity (MME) in the core network. The Cell Broadcast Entity (CBE) server 206 is external to the access and core networks and may be responsible for all aspects of formatting the Cell Broadcast Service (CBS), which is transmitted to the communication device 202 using the CBC server and associated network nodes. The transmission of the warning messages to the communication device 202 are achieved using the Base Transceiver Station (BTS), Node B or the evolved-Node B in GERAN, UTRAN and E-UTRAN respectively.

In some scenarios, the warning messages may be broadcast to all communication devices (even those that may be in idle mode) within a geographical region, with no requirement of an acknowledgement from the communication devices.

As noted before, any latency requirements for the warning messages may entail that the warning messages and/or associated data fields (e.g., security information including the signature and the certificate) may be subject to size constraints. Required security levels may place a requirement on the size of the public keys being used and thus, the associated certificates and the generated signatures. Various certificate schemes and signature schemes are proposed below that provide adequate security level and ensure minimal bandwidth requirements.

Examples of certificate schemes and signature schemes will be described in greater detail below in the setting of the finite group of an elliptic curve defined over a finite field. Such schemes rely on the intractability of the Elliptic Curve Discrete Logarithm Problem (ECDLP). However, these certificate and signature schemes may be modified to work in any finite group in which the discrete logarithm problem appears intractable. Suitable choices include the multiplicative group $Z_p^*$ of a finite field (in particular the finite field $GF(2^n)$ or the finite field Fp), subgroups of $Z_p^*$ of order q, and other groups where the Discrete Logarithm Problem (DLP) may be hard.

These finite groups may also differ in the notation utilized to describe the various operations therein. For example, it is accepted practice to denote the group operations of an elliptic curve group using an additive notation and those of a multiplicative group using a multiplicative notation. As such, if a is a generator of the multiplicative group $Zp^*$ defined over the finite field Fp, p being a prime number, the public key corresponding to a private key a will be $\alpha^a \mod p$. If P is a basepoint generator for an elliptic curve E defined over a finite field Fq, the public key corresponding to a private key a will be aP.

In an ECC scheme, information is encoded in elliptic curve points in an elliptic curve group. An elliptic curve group can be described in terms of a solution to an equation over a finite field, for example, a prime finite field or a characteristic-two finite field. As a particular example, let $\mathbb{F}_p$ represent a prime finite field where p is an odd prime number, and let a, b $\in \mathbb{F}_p$ satisfy $4 \cdot a^2 + 27 \cdot b^2 \neq 0 ((\mod p))$. The elliptic curve group $E(\mathbb{F}_p)$ over $\mathbb{F}_p$, which is defined by the parameters a, b $\in \mathbb{F}_p$, includes the set of points $P=(x,y)$ for $x,y \in \mathbb{F}_p$ that represent a solution to the equation $y^2 \equiv x^a + a \cdot x + b (\mod p)$, together with a point O that is the identity element of the elliptic curve group $E(\mathbb{F}_p)$.

Elliptic curve domain parameters over $\mathbb{F}_p$ can be identified by a sextuple $T=(p,a,b,G,n,h)$. The integer p specifies the finite field $\mathbb{F}_p$. Field elements $a,b \in \mathbb{F}_p$ specify an elliptic curve $E(\mathbb{F}_p)$ over $\mathbb{F}_p$, as discussed above. The elliptic curve point $G=(x_G, y_G)$ on $E(\mathbb{F}_p)$ is a base point generator. The integer n specifies the order of the base point generator G. The cofactor h is equal to $\#E(\mathbb{F}_p)/n$, where the numerator is the number of points on the elliptic curve $E(\mathbb{F}_p)$. Elliptic curve domain parameters may be identified over other types of finite fields. For example, elliptic curve domain parameters over the characteristic two field $\mathbb{F}_{2^m}$ can be identified by a septuple $T=(m,f(x),a,b,G,n,h)$, where m is an integer specifying the finite field $\mathbb{F}_{2^m}$ and $f(x)$ is an irreducible binary polynomial of degree m specifying the representation of $\mathbb{F}_{2^m}$. The elliptic curve domain parameters may be generated and validated by the communication devices and/or by the CA server.

In an ECC scheme, an elliptic curve key pair (d,q) can be generated based on valid elliptic curve domain parameters, by selecting a random integer d in the interval [1,n−1], computing $Q=dG$ and outputting the key pair (d,Q). The random integer d may be selected or obtained by a random number generator or by a deterministic random number generator. Elliptic curve key pairs can be validated using different types of techniques.

The certificate may be a traditional certificate (also referred to as an explicit certificate hereinafter) that includes an identity of the owner of the private key, the public key associated with the private key and a CA's signature that binds the identity and the public key. The CA's signature is generated using the CA's private key. The certificate may also contain additional information such as the validity period of the certificate or other information. Examples of traditional (explicit) certificates are X.509 certificates signed with, for example, Elliptic Curve Digital Signature Algorithm (ECDSA).

An exemplary traditional certificate structure, given in C-style notation, could be defined as follows:

```
typedef CertA_1
byte  identity[2];  /* a two byte subject identity value of the signer */
byte  time[4];      /* a 4 byte date/time value until which the certificate is
                       valid */
byte  curve[1];     /* a one byte curve indicator for which curve the
                       public key is over */
byte  point[33];    /* a byte array which holds the public key */
byte  point[64];    /* a byte array which holds the CA's digital signature
                       pair*/
}CertA_1;
```

For illustrative purposes only, assuming that both the message signer uses the ECDSA digital signature algorithm and operate over the secp256r1 curve described in SEC2: Recommended Elliptic Curve Domain Parameters, Standards for Efficient Cryptography Group, Version 2.0, January 2010, the public key of the message signer will be 257-bits or 33-bytes in size in order to obtain a security level of 128 bits. Assuming that the CA also uses the ECDSA algorithm at 128-bit security level on the curve secp256r1 in generating the certificates shown above, the traditional certificate would be 104 bytes in size. As the signature of the warning message will provide an additional 64 bytes (similar calculation as that of the CA's signature for the certificate, assuming the same elliptic curve and security level), the single transmission comprising the signature and the certificate will be at least 168 bytes in size.

The certificates issued by the CA may be implicit certificates. In an implicit certificate scheme, the certificate comprises a value, denoted $P_U$, which may be jointly computed by the CA and owner of the private key (U), along with some additional information such as the identity of U, denoted $I_U$. The certificate is denoted $Cert_U=(P_U, I_U)$. The public key, denoted $Q_U$, can be derived by anyone (e.g., the communication devices 102 of FIG. 1) from $Cert_U$ and the CA's public key, and public parameters. In embodiments where the value $P_U$ is jointly computed by the CA and U, the private key corresponding to $P_U$ is known only to U.

An example of an implicit certificate scheme is the Elliptic Curve Qu-Vanstone (ECQV) certificate scheme, as described in greater detail in SEC4: Elliptic Curve Qu-Vanstone Implicit Certificate Scheme (ECQV), Standards for Efficient Cryptography Group, Working Draft, Version 0.97 2011, which is incorporated by reference herein. An exemplary ECQV certificate structure, given in C-style notation, could be defined as follows:

```
typedef CertA_2
byte  identity[2];  /* a two byte subject identity value of the signer */
byte  time[4];      /* a 4 byte date/time value until which the certificate
                       is valid */
byte  hash[1];      /* a one byte hash value that indicates which
                       cryptographic hash to use */
byte  curve[1];     /* a one byte curve indicator for which curve the
                       public key is over */
byte  point[33];    /* a byte array which holds the public key
                       reconstruction value */
}CertA_2;
```

Some implementations of the ECQV implicit certificate scheme may be well suited for application environments where resources, such as bandwidth, computing power, and storage are limited. In those cases, ECQV implicit certificates may provide a more efficient alternative to some other types of certificates.

For example, assuming the same elliptic curve (secp256r1), the 128-bit security level and the use of ECDSA algorithm for signing by the message signer (thus requiring a 257-bit or 33-byte public key for the message signer) as shown above for the traditional certificate, the ECQV certificate will be 41 bytes in size. The addition of 64 bytes for the signature of the warning message results in a single transmission of at least 105 bytes.

Assuming a 112-bit security level, the public key could 225-bits or 29-bytes in size. Assuming the 112-bit security level and the secp256r1 elliptic curve, the ECQV certificate could be 33 bytes in size. A smaller elliptic curve may also be sufficient to provide 112-bit security. Some of the fields of the ECQV certificate structure shown above may be optional and may be removed in some implementations. One such ECQV certificate structure, given in C-style notation, could be defined as follows:

```
typedef CertA_3
byte  time[4];      /* a 4 byte date/time value until which the certificate is
                       valid */
byte  point[29];    /* a 29 byte array which holds the public key
                       reconstruction value */
}CertA_3;
```

The elliptic curve point may thus also serve the function of a serial number for the certificate.

Typically, the message signer may generate a private value and a corresponding public value prior to requesting a certificate from the CA. This private/public value pair may be its private/public key pair. In the ECQV scenario, the public value generated by the message signer may be combined with a public value generated by the CA prior to the generation of the ECQV certificate. Thus, the private key of the message signer in this ECQV scenario is dependent on a private value corresponding to the public value generated by the CA, and thus may not be the same as the private value of the message signer generated prior to the certification request.

Alternately, the message signer may also utilize a trusted party to generate private/public keys on its behalf. This trusted third party may be the CA server 104 of FIG. 1. For example, an ECQV-escrow protocol may be used instead of the conventional ECQV protocol to generate the certificate. ECQV-escrow protocols can be considered to be identical to the general ECQV protocol except that certificate requests may be replaced by (0,O) (the trivial key pair, where the private value of the certificate request is the integer zero, and the public value is the identity element of the arithmetic group of operation (in elliptic curve groups used in ECQV, this identity element is also referred to as the point at infinity); the CA's response to the message signer is made secure as this response contains the private key of the message signer.

Different signing schemes may be used to compute the signature for the warning messages. Examples of elliptic curve-based digital signatures schemes include ECDSA (Elliptic Curve Digital Signature Algorithm), ECPVS (Elliptic Curve Pintsov Vanstone Signatures), and ECNR (Elliptic Curve Nyberg Rueppel). Additional signature schemes may also be used for signing the warning messages. The various signing schemes may differ in the resulting signature sizes for a specific security level, and also in whether portion of the warning message is encoded (thus, creating possible concerns for legacy communication devices) as a result of the signing scheme.

The appropriate choice of a signing scheme may vary based on the radio technology being used. For example, the 4-second latency requirement for ETWS messages may place a size constraint of 75 bytes for the security information related to the warning message, in Global System for Mobile Communications (GSM). For UMTS systems, the same 4-second latency requirement may still allow for 160 bytes of security information for the warning message.

The signature of the warning message may be computed using an Elliptic Curve Digital Signature Algorithm (ECDSA) signing scheme as described in ANSI X9.62-2005, American National Standard for Financial Services, Public Key Cryptography for the Financial Services Industry: The Elliptic Curve Digital Signature Algorithm (ECDSA), November 2005. For an exemplary curve and security level previously noted, the single transmission comprising the certificate and the signature of the warning message may be at least 168 bytes or 105 bytes depending on whether a traditional certificate or an ECQV certificate is issued by the CA.

The signature algorithm used in signing may also be the Elliptic Curve Pintsov-Vanstone Signature (ECPVS) as described in ANSI X9.92-1-2009, American National Standard for Financial Services, Public Key Cryptography for the Financial Services Industry: Digital Signature Algorithms Giving Partial Message Recovery Part 1: Elliptic Curve Pintsov-Vanstone Signatures (ECPVS), August 2009.

Padding bits may be added to the warning message to provide the necessary redundancy prior to the computation of the signature. Optionally, the inherent redundancy of the warning message may also be utilized and padding bits may be added only as necessary to achieve the desired security levels. For example, as ETWS messages are typically text messages, they may deliver a fixed amount of redundancy per byte based on the allowable characters in the message string. For instance, printable ASCII supports only 95 characters per byte resulting in 63% redundancy per byte, i.e.: 63% of the potential 256 characters are redundant in printable ASCII; for a message length of 90 bytes at 63% redundancy per byte, a random byte sequence would approximately have $10^{-9}$ chance of being incorrectly determined as a valid ETWS message.

Considering the entire warning message to be the recoverable portion as specified in Section 8.2 of the above-noted ANSI X9.92-1 specification, the ECPVS message representative r is nearly, and possibly, the same size as the message M. If we encode the message representative as the warning message, the single transmission can comprise of the ECPVS integer s and the certificate. Assuming the 128-bit security level, the ECPVS integer s would be at least 32 bytes in size, resulting in a single transmission of 73 bytes assuming an ECQV certificate of 41 bytes in size. As the warning message is now encoded as the ECPVS message representative r, legacy communication devices may however not be able to decipher the warning message. This concern may be allayed by choosing padding bits to be the portion of the message that is encoded.

A variant of the Schnorr signing scheme defined over an elliptic curve group could also be used to sign the warning messages. The signing scheme and the corresponding verifying scheme are described below. These may also be used with any data and/or messages, and are not intended to be restricted for use only with warning messages.

Signing:
Input:
　M: Message to be signed;
Actions:
　1. Generate ephemeral key pair (k, R), where k is an integer selected in a random fashion within the range [1, n−1], n being the order of the basepoint generator P on the elliptic curve; and R is an elliptic curve point satisfying the relationship R=kP
　2. Convert R to a bit string using an appropriate point-to-octet conversion function, such as exemplarily described in Section 2.3.3 of SEC 1: Elliptic Curve Cryptography, Standards for Efficient Cryptography Group, Version 2.0, May 21, 2009
　3. Compute h=Hash(M∥R)
　4. Convert h to an integer e (SEC 1 document noted in the above steps provides an exemplary conversion, first using Section 2.3.1 to convert h to an octet string e0, and then using the conversion routine of Section 2.3.8 to convert e0 to e)
　5. Compute s=ae+k mod n, where a is the private key associated with the certificate
Output: s, e
Verifying:
　1. Obtain public key Q of the message signer from certificate, where Q is related to a by the relation Q=aP
　2. Compute R'=_sP−eQ
　3. e'=Hash(M∥R')
　4. Accept the signature if e'=e A keyed-MAC signing scheme with its corresponding verifying scheme are described below. The signing and verifying schemes described below may also be used with any data and/or messages, and are not intended to be restricted for use only with warning messages.

The Message Authentication Code (MAC) function for use with these schemes may be the Cipher-Based MAC (CMAC) or the Cipher Block Chaining MAC (CBC-MAC). This scheme may provide short signature sizes while still allowing for display of the warning messages by legacy communication devices, as no encoding of the warning message occurs unlike the ECPVS signing schemes described above.

Signing:
Input:
　$d_A$: A's private key
　M: Message to be signed
　MACAlgorithm: An appropriate keyed MAC function
　KDF: A key derivation function
Actions:
　1. Generate ephemeral key pair (k; R), wherein k is a integer selected at random in the range [1, n−1] where n is the order of the basepoint generator P on the elliptic curve; and R is an elliptic curve point satisfying the relationship R=kP
　2. Derive the MAC key k=KDF(R, OtherInfo); the string OtherInfo may be optional
　3. Compute MAC=MACAlgorithm (M, k)
　4. Compute h=Hash (MAC∥M), where Hash is a suitable hash function; the hash function may optionally take additional input such as an identity string of the signer
　5. Convert h to an integer e, using an appropriate bit to integer function (SEC 1: Elliptic Curve Cryptography, Standards for Efficient Cryptography Group, Version 2.0, May 21, 2009 provides an exemplary conversion, first using Section 2.3.1 to convert h to an octet string e0, and then using the conversion routine of Section 2.3.8 to convert e0 to e)
　6. Calculate s=e$d_A$+k(mod n)
Output:
　MAC, s;
The single transmission comprises the output of the signing algorithm along with the certificate, $Cert_A$ corresponding to the private key $d_A$.

Verifying:
Input:
　MAC, s;
　$Cert_A$: A certificate corresponding to A's private key $d_A$;
　M: message;
　QcA: CA's public key;

Output:
  VALID or INVALID
Actions:
  1. Compute h=Hash (MAC∥M), with the same hash function and additional optional information as used in the signature generation scheme noted above
  2. Convert h to an integer e, using the same bit-to-integer function as noted above;
  3. Obtain the message signer's public key $Q_A$ from $Cert_A$;
  4. Compute R'=sG−eQA
  5. Compute k'=KDF(R'), with the same KDF and OtherInfo as noted above
  6. Compute MAC'=MACAlgorithm (M, k')
  7. If MAC'=MAC then return VALID, else return INVALID For a traditional certificate, step 3 of the verifying scheme may mean verifying the CA's signature on the certificate and parsing the certificate to obtain the public key of the message signer. For an ECQV certificate, step 3 entails reconstruction of the public key from the ECQV certificate using the CA's public key and other public information; a confirmation of the binding of the identity with the reconstructed public key is deferred until step 7 when the signature generated using the corresponding private key is confirmed as verified.

Assuming a 112-bit security level and use of a 112-bit MAC, this scheme requires 14 bytes and 28 bytes to encode the values MAC and s respectively. Assuming a 128-bit security level and use of a 128-bit MAC algorithm, this scheme will require 16 bytes and 32 bytes to encode the values MAC and s respectively. Assuming a ECQV certificate of size 33 bytes and 37 bytes (removing any optional fields) for 112-bit and 128-bit security levels respectively, this results in a total size of at least 75 bytes and 89 bytes respectively for the single transmission comprising the signature and the ECQV certificate.

The above solutions may be modified to allow for multiple root CAs by adding a two byte issuer identifier (issuer id) to the certificate structure, and provisioning all the communication devices with a multitude of root certificates.

The CAs may operate in near real time, issuing signing certificates for short time durations (e.g., of validity periods of a day or a week), and thus minimizing the need for certificate revocation techniques that might be required for longer term certificates.

The servers such as the servers 106-b and the CA server 104 generally includes a data processing apparatus, a data storage medium, and a communication interface. The memory can include, for example, a random access memory (RAM), a storage device (e.g., a writable read-only memory (ROM)), a hard disk, or another type of storage medium. FIG. 4 shows an exemplary method that can be performed by a server (exemplarily a server such as 106a or 106b in FIG. 1), in accordance with an aspect of the disclosure. The server obtains a message at 1062, generates a signature thereof at 1064 using a private key corresponding to a certificate (for example, a certificate generated by the CA server 104 of FIG. 1), and sends single transmission comprising the signature and certificate at 1066.

The exemplary CA server 104 of FIG. 1 can be preprogrammed or it can be programmed (and reprogrammed) by loading a program from another source (e.g., from a CD-ROM, from another computer device through a data network, or in another manner). The I/O controller can be coupled to input/output devices (e.g., a monitor, a keyboard) and to the network 108. The input/output devices receive and transmit data in analog or digital form over communication links such as a serial link, wireless link (e.g., infrared, radio frequency), parallel link, or another type of link. The memory can store instructions (e.g., computer code) associated with computer applications, programs and computer program modules, and other resources. The memory can also store application data and data objects that can be interpreted by applications, programs, modules, or virtual machines running on the CA server 104. The memory can store additional information, for example, files and instruction associated with an operating system, device drivers, archival data, or other types of information. The processor can execute instructions to generate output data based on data inputs. For example, the processor can run applications and programs by executing or interpreting software, scripts, functions, executables, and other types of computer program modules. The input data received by the processor and the output data generated by the processor can be stored in a computer-readable medium, such as the memory or a storage device.

The network 108 can include any collection of terminals, links and nodes which connect to enable communication between users of terminals. For example, the network 108 can include a wireless or wired network, a cellular network, a telecommunications network, an enterprise network, an application-specific public network, a Local Area Network (LAN), a Wide Area Network (WAN), a private network, a public network (such as the Internet), a WiFi network, a network that includes a satellite link, or another type of communication network. The network 108 can include a tiered structure defined by firewalls or similar features that implement various levels of security. The network may comprise of various nodes such as servers, gateways, or routers.

Communication devices 102 are computing devices that can communicate over the communication network 108 based on communication schemes specified by the cryptography system. The communication devices 102a-d are generally operable to receive, transmit, process, and store information. The communication devices typically include a data processing apparatus, a data storage medium, and a communication interface. FIG. 3 shows an exemplary method that can be performed by a communication device 102a-d, in accordance with an aspect of the disclosure. The communication device 102a-d receives a single transmission comprising a signature and a certificate at 1002, verifies the signature using a public key associated with the certificate at 1004, and proceeds to display the message corresponding to the signature at 1006 if the verification is successful. The communication device may still display the message at 1008 even if the verification fails.

For example, the communication devices can include a memory, a data processor, and an input/output controller. A communication device can include user interface devices, for example, a monitor, a touchscreen, mouse, or keyboard. The communication devices interface with the network 108. The memory of the communication device can store messages and information associated with the cryptography system. For example, a communication device may store the public and private key data, digital certificate data, and other types of information. The memory of the communication device can store instructions (e.g., computer code) associated with computer applications, programs and computer program modules, and other resources. Communication devices can include handheld devices such as smart phones, personal digital assistants (PDAs), portable media players, laptops, notebooks, tablets, and others. They may also include work stations, mainframes, non-portable computing systems, devices installed in structures, vehicles, and other types of installations.

Subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on non-transitory computer storage medium for execution by, or to control the operation of, data processing apparatus. Alternatively or in addition, the program instructions can be encoded for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple cards, disks, or other storage devices).

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computing device or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computing device. Generally, a processor will receive instructions and data from a read-only memory or a random access memory or both. The essential elements of a computing device are a processor for performing actions in accordance with instructions and one or more memory devices for storing instructions and data. Generally, a computing device will also include, or be operatively coupled to receive data from or transfer data to, or both, one or more storage devices for storing data. However, a computing device need not have such devices.

Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, subject matter described in this specification can be implemented on a computer having a display device, e.g., an LCD (liquid crystal display) screen for displaying information to the user and a keyboard and a pointing device, e.g., touch screen, stylus, mouse, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computing device can interact with a user by sending documents to and receiving documents from a device that is used by the user; for example, by sending web pages to a web browser on a user's client device in response to requests received from the web browser.

Some of the subject matter described in this specification can be implemented in a computing system that includes a back-end component, e.g., as a data server, or that includes a middleware component, e.g., an application server, or that includes a front-end component, e.g., a client computing device having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a data network.

The computing system can include clients and servers. A client and server are generally remote from each other and typically interact through a data network. The relationship of client and server arises by virtue of computer programs running on the respective computers and having a client-server relationship to each other. In some implementations, a server transmits data to a client device. Data generated at the client device can be received from the client device at the server.

Figure 5:
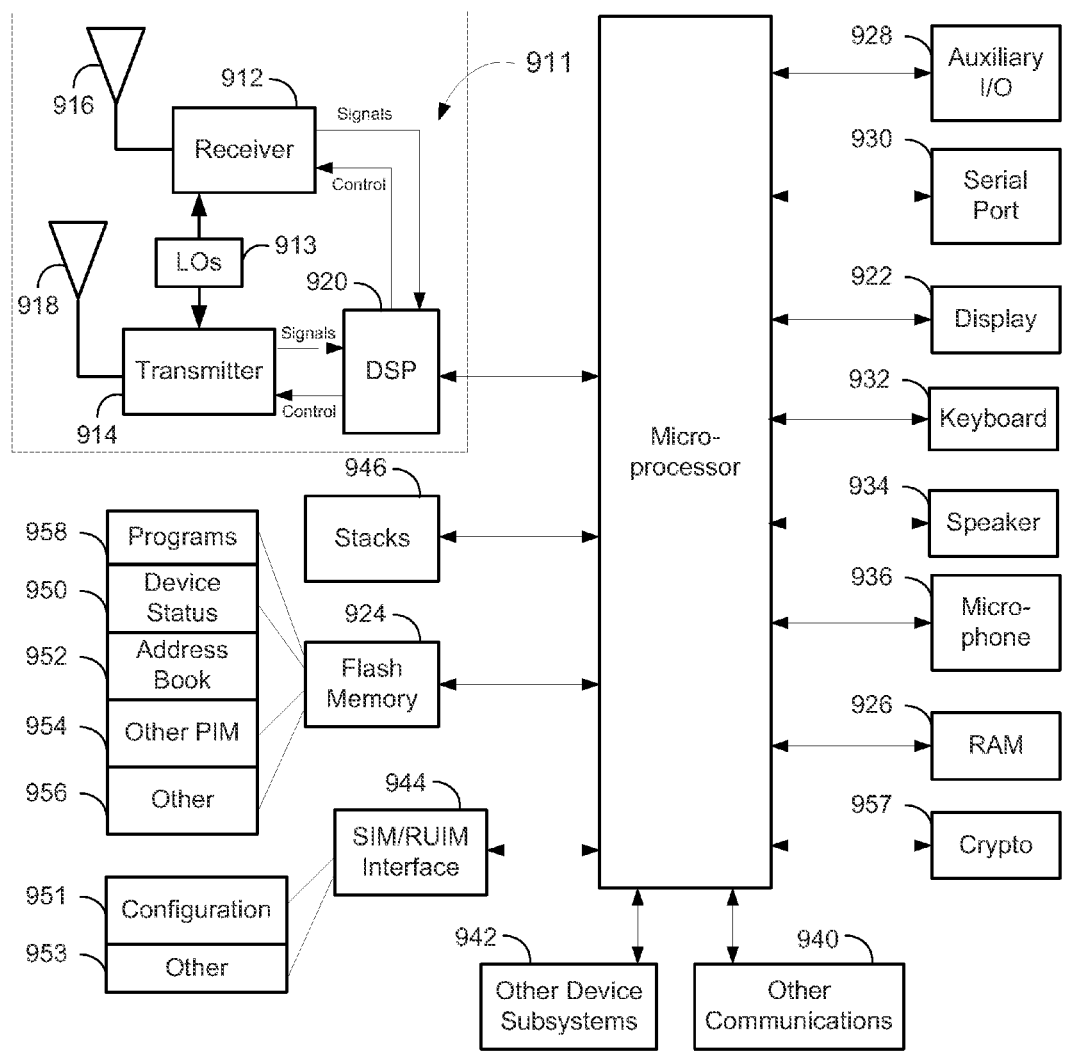
FIG. 5 is a block diagram illustrating a mobile communication device.

FIG. 5 is a block diagram illustrating a mobile device, which can act as a communication device 102 of FIG. 1 and can co-operate with the apparatus and methods of FIG. 3, and which is an exemplary wireless communication device. Mobile device 900 is preferably a two-way wireless communication device having voice and/or data communication capabilities. Mobile device 900 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile device 900 is enabled for two-way communication, it will incorporate a communication subsystem 911, including both a receiver 912 and a transmitter 914, as well as associated components such as one or more, preferably embedded or internal, antenna elements 916 and 918, local oscillators (LOs) 913, and processing means such as a processing module such as a digital signal processor (DSP) 20. As will be apparent to those skilled in the field of communications, the particular design of the communication subsystem 911 will be dependent upon the communication network in which the device is intended to operate. For example, mobile device 900 may include a communication subsystem 911 designed to operate within the Mobitex™ mobile communication system, the DataTAC™ mobile communication system, GPRS network, UMTS network, EDGE network or LTE network.

Network access requirements will also vary depending upon the type of network 902. For example, in the Mobitex and DataTAC networks, mobile device 900 is registered on the network using a unique identification number associated with each mobile device. In LTE, UMTS and GPRS networks, however, network access is associated with a subscriber or user of mobile device 900. A GPRS mobile device therefore requires a subscriber identity module (SIM) card in order to operate on a GPRS network. Without a valid SIM card, a GPRS mobile device will not be fully functional. Local or non-network communication functions, as well as legally required functions (if any) such as "911" emergency calling, may be available, but mobile device 900 will be unable to carry out any other functions involving communications over the network 902. The SIM interface 944 is normally similar to a card-slot into which a SIM card can be inserted and ejected like a diskette or PCMCIA card. The SIM card can have approximately 64K of memory and hold many key configuration 951, and other information 953 such as identification, and subscriber related information.

When required network registration or activation procedures have been completed, mobile device 900 may send and receive communication signals over the network 902. Signals received by antenna 916 through communication network 902 are input to receiver 912, which may perform such common receiver functions as signal amplification, frequency down conversion, filtering, channel selection and the like, and in the example system shown in FIG. 8, analog to digital (A/D) conversion. A/D conversion of a received signal allows more complex communication functions such as demodulation and decoding to be performed in the DSP 920. In a similar manner, signals to be transmitted are processed, including modulation and encoding for example, by DSP 920 and input to transmitter 914 for digital to analog conversion, frequency up conversion, filtering, amplification and transmission over the communication network 902 via antenna 918. DSP 920 not only processes communication signals, but also provides for receiver and transmitter control. For example, the gains applied to communication signals in receiver 912 and transmitter 914 may be adaptively controlled through automatic gain control algorithms implemented in DSP 920. In the 3GPP environment, the single transmission may be broadcast to the communication devices within a certain geographical area (also known as Notification Area) using the Cell Broadcast Channel (CBCH).

The mobile device may include a cryptographic module 957 that is operable to perform the various operations described above. The cryptographic module may perform one or more of the various steps for verification of the signature of the warning message. The cryptographic module may allow for representation of the elliptic curve points in different formats and may perform various conversion operations for converting among the different formats and other routines for checking the validity of each format. For example, an ECC scheme may specify a bit string format, an elliptic curve point format, an octet string format, an integer format, a field element format, and others. Correspondingly, other entities of the system of FIG. 1 such as CA server 104 and the message signer servers (106a or 106b) may also include cryptographic modules configured to perform various cryptographic operations such as described above.

Mobile device 900 preferably includes processing means such as a microprocessor 938 which controls the overall operation of the device. Communication functions, including at least data and voice communications, are performed through communication subsystem 911. Microprocessor 938 also interacts with further device subsystems such as the display 922, flash memory 924, random access memory (RAM) 926, auxiliary input/output (I/O) subsystems 928, serial port 930, keyboard 932, speaker 934, microphone 936, a short-range communications subsystem 940 and any other device subsystems generally designated as 942.

Some of the subsystems shown in FIG. 5 perform communication-related functions, whereas other subsystems may provide "resident" or on-device functions. Notably, some subsystems, such as keyboard 932 and display 922, for example, may be used for both communication-related functions, such as entering a text message for transmission over a communication network, and device-resident functions such as a calculator or task list.

Operating system software used by the microprocessor 938 is preferably stored in a persistent store such as flash memory 924, which may instead be a read-only memory (ROM) or similar storage element (not shown). Those skilled in the art will appreciate that the operating system, specific device applications, or parts thereof, may be temporarily loaded into a volatile memory such as RAM 926. Received communication signals may also be stored in RAM 926.

As shown, flash memory 924 can be segregated into different areas for both computer programs 958 and program data storage 950, 952, 954 and 956. These different storage types indicate that each program can allocate a portion of flash memory 924 for their own data storage requirements. Microprocessor 938, in addition to its operating system functions, preferably enables execution of software applications on the mobile device. A predetermined set of applications that control basic operations, including at least data and voice communication applications for example, will normally be installed on mobile device 900 during manufacturing. A preferred software application may be a personal information manager (PIM) application having the ability to organize and manage data items relating to the user of the mobile device such as, but not limited to, e-mail, calendar events, voice mails, appointments, and task items. Naturally, one or more memory stores would be available on the mobile device to facilitate storage of PIM data items. Such PIM application would preferably have the ability to send and receive data items, via the wireless network 902. In a preferred embodiment, the PIM data items are seamlessly integrated, synchronized and updated, via the wireless network 902, with the mobile device user's corresponding data items stored or associated with a host computer system.

Further applications may also be loaded onto the mobile device 900 through the network 902, an auxiliary I/O subsystem 928, serial port 930, short-range communications subsystem 940 or any other suitable subsystem 942, and installed by a user in the RAM 926 or preferably a non-volatile store (not shown) for execution by the microprocessor 938. Such flexibility in application installation increases the functionality of the device and may provide enhanced on-device functions, communication-related functions, or both. For example, secure communication applications may enable electronic commerce functions and other such financial transactions to be performed using the mobile device 900.

In a data communication mode, a received signal such as a text message or web page download will be processed by the communication subsystem 911 and input to the microprocessor 938, which preferably further processes the received signal for output to the display 922, or alternatively to an auxiliary I/O device 928. A user of mobile device 900 may also compose data items such as email messages for example, using the keyboard 932, which is preferably a complete alphanumeric keyboard or telephone-type keypad, in conjunction with the display 922 and possibly an auxiliary I/O device 928. Such composed items may then be transmitted over a communication network through the communication subsystem 911.

For voice communications, overall operation of mobile device 900 is similar, except that received signals would preferably be output to a speaker 934 and signals for transmission would be generated by a microphone 936. Alternative voice or audio I/O subsystems, such as a voice message recording subsystem, may also be implemented on mobile device 900. Although voice or audio signal output is preferably accomplished primarily through the speaker 934, display 922 may also be used to provide an indication of the identity of a calling party, the duration of a voice call, or other voice call related information for example. The display 922 may also be used to provide the warning messages to the user of the mobile device. As noted before, in some implementations, the warning message may be displayed only if the verification of the signature of the warning message is successful. In other implementations, at least a portion of the warning message is displayed even if the verification of the signature is unsuccessful or incomplete. The warning message may be displayed upon reception without any user interaction.

Serial port 930 in FIG. 8, would normally be implemented in a mobile device for which synchronization with a user's desktop computer (not shown) may be desirable, but is an optional device component. Such a port 930 would enable a user to set preferences through an external device or software application and would extend the capabilities of mobile device 900 by providing for information or software downloads to mobile device 900 other than through a wireless communication network. The alternate download path may for example be used to load the CA's public key through a direct and thus reliable and trusted connection to thereby enable secure device communication.

Other communications subsystems 940, such as a short-range communications subsystem, is a further optional component which may provide for communication between mobile device 900 and different systems or devices that are similarly enabled, which need not necessarily be similar devices. For example, the subsystem 940 may include an infrared device and associated circuits and components or a Bluetooth™ communication module.

Furthermore it will be noted that the apparatus described herein may comprise a single component such as a mobile device or other user equipment or access network components, a combination of multiple such components for example in communication with one another or a sub-network or full network of such components.

Some of the specific implementations may have been described herein in relation to 3GPP specifications. However the method and apparatus described are not intended to be limited to the specifications or the versions thereof referred to herein but may be applicable to future versions or other specifications.

A portion of the disclosure of this patent document contains material which is subject to copyright protection. The copyright owner has no objection to the facsimile reproduction by anyone of the patent document or patent disclosure, as it appears in the Patent and Trademark Office patent file or records, but otherwise reserves all copyright rights whatsoever.

While this specification contains many specific implementation details, these should not be construed as limitations on the scope of what may be claimed, but rather as descriptions of features specific to particular implementations. It will, however, be evident that various modifications and changes may be made thereto without departing from the scope of the technique. The specification and drawings are, accordingly, to be regarded in an illustrative rather than a restrictive sense. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method at a server, said method comprising:
   obtaining a broadcast message;

computing a signature for said broadcast message using a private key, said private key associated with a certificate; and sending a transmission to a communication device, said transmission comprising said signature, said broadcast message, and the certificate that identifies a public key associated with the private key, wherein the public key can be used in verification of said signature.

2. The method of claim 1, wherein the broadcast message is a warning message.

3. The method of claim 1, wherein said private key is provided to said server using a secure link by a certificate authority that generated said certificate.

4. The method of claim 1, wherein said server is a network server and obtaining said broadcast message comprises receiving said broadcast message from a second server using an authenticated communication link therebetween.

5. The method of claim 1, wherein said obtaining a broadcast message comprises generating said broadcast message.

6. A server comprising a processor and a memory including stored instructions, said server configured to:
    obtain a broadcast message;
    compute a signature for said broadcast message using a private key, said private key associated with a certificate; and
    send a transmission to a communication device, said transmission comprising said signature, said broadcast message, and said certificate that identifies a public key associated with the private key, wherein the public key can be used in verification of said signature.

7. The server of claim 6, wherein the broadcast message is a warning message.

8. The server of claim 6, wherein said private key is provided to said server using a secure link by a certificate authority that generated said certificate.

9. The server of claim 6, wherein said server is a network server and obtaining said broadcast message comprises receiving said broadcast message from a second server using an authenticated communication link therebetween.

10. The server of claim 6, wherein said obtaining a broadcast message comprises generating said broadcast message.

11. A computer program product encoded on a non-transitory medium, the product comprising computer-readable instructions for causing one or more processors to perform operations comprising:
    obtaining a broadcast message;
    computing a signature for said broadcast message using a private key, said private key associated with a certificate; and
    sending a transmission to a communication device, said transmission comprising said signature and said certificate that identifies a public key associated with the private key, wherein the public key can be used in verification of said signature.

* * * * *